July 23, 1968　　　C. S. LONGSTREET ET AL　　　3,393,691
FUEL CONTROL HAVING PROPORTIONAL PLUS INTEGRAL GOVERNOR
WITH VARIABLE PROPORTIONAL AND INTEGRAL GAINS
Filed Dec. 13, 1965　　　　　　　　　　　　　　　2 Sheets-Sheet 1
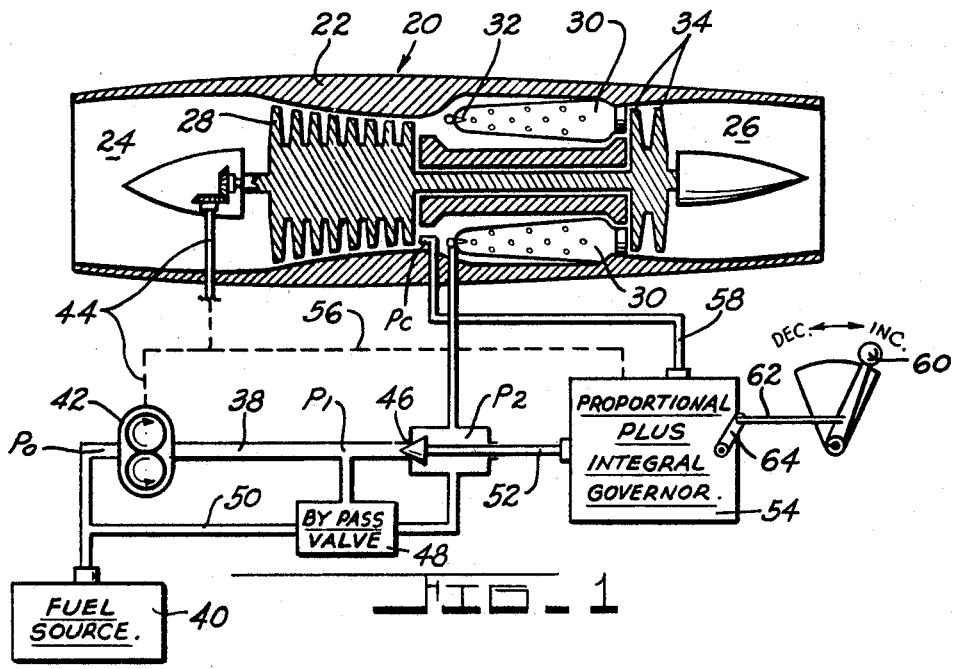
FIG_1
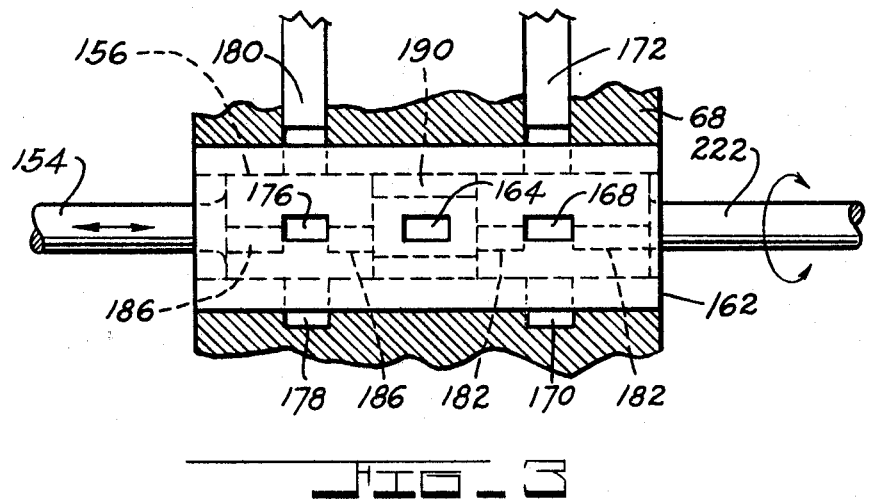
FIG_3
INVENTOR.
CHARLES S. LONGSTREET.
MICHAEL P. FODROCI.
JOSEPH L. PECZKOWSKI.
BY
AGENT

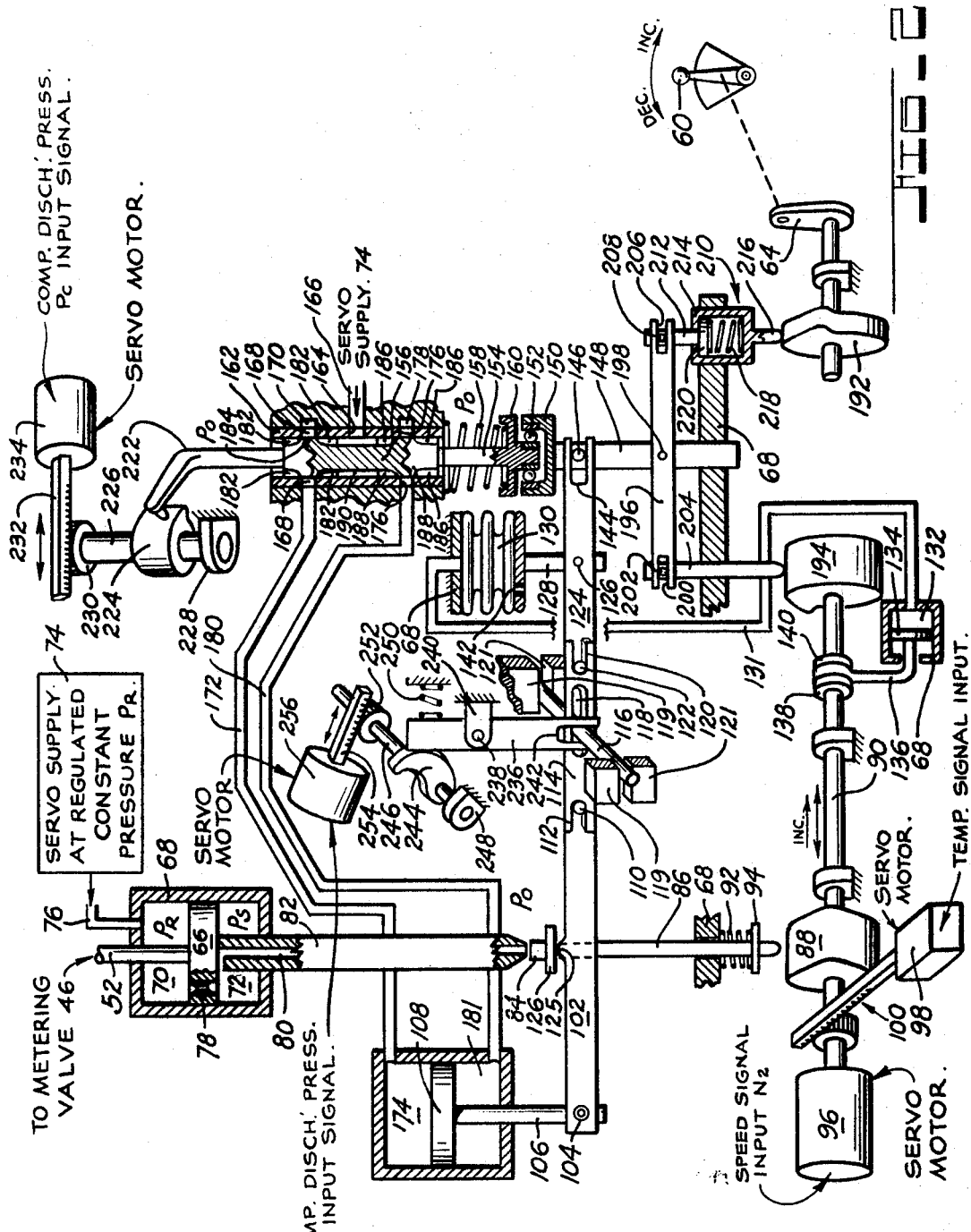

United States Patent Office 3,393,691
Patented July 23, 1968

3,393,691
FUEL CONTROL HAVING PROPORTIONAL PLUS INTEGRAL GOVERNOR WITH VARIABLE PROPORTIONAL AND INTEGRAL GAINS
Charles S. Longstreet, Michael P. Fodroci, and Joseph L. Peczkowski, South Bend, Ind., assignors to The Bendix Corporation, a corporation of Delaware
Filed Dec. 13, 1965, Ser. No. 513,180
6 Claims. (Cl. 137—16)

This invention relates in general to speed control governor apparatus for controlling fuel flow to a combustion engine and, in particular, to a gas turbine engine proportional plus integral acting speed governor having a variable proportional gain and/or a variable integral gain as a function of a variable engine operating condition.

High performance jet propelled aircraft, particularly of the supersonic type, utilizing a gas turbine engine or engines to propel the same demand exacting control over fuel flow to the engine or engines as the case may be to compensate for engine response characteristics which may vary in accordance with certain flight conditions such as ambient air pressure and/or temperature as well as the ram air effect at the engine air inlet over a wide range of altitude and flight speeds. For example, variations in the mass air flow through the engine air inlet caused by changes in the abovementioned conditions have a resulting effect in the engine time constant which may vary by a factor of 10 over an operating range of altitude and flight speeds. At sea level, engine inlet ram air conditions, the engine time constant may be three-tenths second while at sixty thousand feet altitude with a flight speed of .9 $N_m$ the engine time constant may increase to three seconds. Also, the engine gain characteristic will vary in a similar way as will be understood by those persons skilled in the art.

In view of the abovementioned variable engine response characteristic, it is obvious that fuel flow to the engine and thus the engine operation may be readily controlled for optimum engine performance for any given altitude and flight speed but, without adequate compensation on fuel flow to the engine for deviations from the given altitude and/or flight speed, the response characteristics of the engine under different power request settings are not optimum and may be unsatisfactory.

It is therefore an object of the present invention to provide a proportional plus integral engine speed governor having variable gain characteristics to compensate for variations in engine response characteristics caused by an operating condition related to engine power output.

It is another object of the present invention to provide a proportional plus integral engine speed governor characterized by a variable proportional gain and a variable integral gain controlled as a function of an operating condition upon which the engine response characteristic depends.

Other objects and advantages of the present invention will become apparent to those skilled in the art in view of the following description taken in conjunction with the accompanying drawings wherein:

FIGURE 1 is a schematic representation of a gas turbine engine and fuel control system therefor embodying the present invention;

FIGURE 2 is a detailed representation in schematic form of the present invention shown in block form and labeled "Proportional Plus Integral Governor" in FIGURE 1; and FIGURE 3 is an enlarged view of a portion of FIGURE 2, showing a rotatable and axially movable valve member in combination with a surrounding sleeve and casing and the relative position of the various ports therein.

Referring to the drawings, numeral 20 generally designates a gas turbine engine having a casing 22, the forward end of which defines an air inlet 24 and the aft end of which defines an exhaust outlet 26. Air pressurized by a compressor 28 is delivered to one or more combustion chambers 30 where fuel injected therein from associated fuel injection nozzles 32 mixes with the pressurized air and the resulting mixture burned to provide hot motive gases which pass through one or more turbines 34 and exit from exhaust outlet 26 to the atmosphere thereby providing a propelling thrust to the engine. The compressor 28 is driven by the turbine 34 connected thereto via a shaft 36 rotatably mounted in suitable bearings, not shown.

A pressurized metered flow of fuel is supplied to fuel injection nozzles 32 via a fuel conduit 38 leading from a fuel source 40. A fuel pump 42 driven by the compressor 28 through suitable shaft and gears generally indicated by 44 is adapted to pressurize fuel through conduit 38. A variable area fuel metering valve 46 disposed in fuel conduit 38 downstream from pump 42 controls the flow of fuel through conduit 38 to the fuel injection nozzles 32. A conventional fuel bypass valve generally indicated by 48 is responsive to the $P_1-P_2$ fuel pressure differential across metering valve 46 and operates in the usual manner to return excess fuel from conduit 38 to the fuel pump inlet at pressure $P_0$ via a passage 50 to thereby control the fuel pressure differential $P_1-P_2$ across valve 46 to a constant valve irrespective of the flow area defined by valve 46.

The metering valve 46 is connected via a rod 52 to the proportional plus integral governor apparatus generally indicated by 54 which provides an output position signal for actuating valve 46. The proportional plus integral governor apparatus 54 is provided control input signals including compressor speed via shaft and gears generally indicated by 56, compressor discharge air pressure, $P_c$, via a passage 58 and the position of a throttle lever 60 via link 62 and lever 64.

Referring to FIGURE 2 which illustrates the internal component structures of the Proportional Plus Integral Governor of FIGURE 1, numeral 66 designates a servo piston slidably carried in a casing 68 and exposed on opposite sides to chambers 70 and 72. A suitable connecting medium which may take the form of rod 52 fixedly secured at one end to piston 66 slidably extends through casing 68 into engagement with metering valve 46 as shown in FIGURE 1. A conventional fluid pressure regulated servo supply generally indicated by 74 is connected via passage 76 to chamber 70. It will be understood that the servo supply 74 may take any one of a number of well known forms such as a source of pressurized fuel which undergoes a pressure reduction by suitable spring loaded valve apparatus, not shown, in flow controlling relationship therewith to provide a continuous supply of fuel at regulated constant pressure $P_R$ to chamber 70. The fuel in chamber 70 passes through a restricted passage 78 disposed in piston 66 to chamber 72 at pressure $P_s$ from which chamber 72 the fuel exits via a passage 80 formed in a stem 82 integral with piston 66. The stem 82 slidably extends through casing 68 and passage 80 discharges to the interior of casing 68 at relatively low drain fuel pressure $P_0$. The flow of fuel out of chamber 72 and thus the fuel pressure drop $P_R-P_s$ across piston 66 is controlled by a valve member 84 which cooperates with the discharge end of passage 80 to thereby vary the effective flow area of the latter.

The valve member 84 is integral with or otherwise suitably connected to be actuated by a follower 86 which, under certain engine operating conditions as will be explained hereinafter, rides on a three dimensional cam 88 carried by a rotatably and axially movable shaft 90 supported by casing 68. A spring 92 interposed between casing 68 and a spring retainer 94 fixedly secured to follower 86 serves to load follower 86 into engagement with the contoured surface of the cam 88. The shaft 90 and the cam 88 attached thereto is actuated axially by a suitable conventional servomotor generally indicated by 96, which has an output motion as a function of an engine speed input signal, $N_2$, and rotationally by a suitable conventional servomotor generally indicated by 98, which has an output motion as a function of an engine temperature input signal, T. The output motion of servomotor 98 may be transferred to shaft 90 via a rack and pinion arrangement generally indicated by 100.

A lever 102 is pivotally mounted on a pin 104 secured to a stem 106 fixed to an integrating piston 108. The opposite end of lever 102 carries a pin 110 which extends into a slot 112 formed in one end of a lever 114. The lever 114 is pivotally supported by a shaft 116 which extends through an elongated slot 118 extending axially along lever 114. The end portions of shaft 116 are slidably supported and guided by spaced apart members 119 and 121 associated with each end of the shaft 116. A slot 120 formed in the opposite end of lever 114 receives a pin 122 secured to one end of a lever 124. A projection 125 integral with lever 102 is adapted ot abut a flange 126 integral with follower 86 to thereby lift follower 86 off cam whereupon the position of valve 84 is dependent upon the position of lever 102 as will be described later.

The lever 124 is pivotally secured to a pin 126 carried by a stem 128 which is fixedly secured to and movable with the movable end of a bellows 130. The opposite end of bellows 130 is suitably secured to a fixed support as, for instance, casing 68. The interior of bellows 130 is vented via a passage 131 to a variable volume chamber 132 partially defined by a piston 134 slidably carried by casing 68. The piston 134 is fixedly secured to and actuated by an arm 136, one end of which is enlarged and bored to rotatably receive shaft 90. Spaced apart retaining members 138 and 140 suitably fixed to shaft 90 on opposite sides of arm 136 permit actuation of arm 136 in response to axial movement of shaft 90 and relative movement between shaft 90 and arm 136 in response to rotational movement of shaft 90. Therefore, actuation of piston 134 is limited to response to axial movement of shaft 90 as a function of the $N_2$ speed signal input. The bellows 130 is vented interiorly to relatively low drain fuel pressure, $P_o$, via a restriction 142 suitably secured in the movable end of bellows 130. The one end of lever 124 is provided with a slot 144 which receives a pin 146 fixedly secured to a stem 148. The stem 148 is slidably carried by casing 68 and is provided with a bearing retaining member 150 at one end thereof. The retainer 150 is adapted to receive the outer race of a ball bearing 152, the inner race of which bearing is secured to the end portion of a stem 154 integral with a double landed valve member 156. A preload is applied to stem 148 by a spring 158 interposed between casing 68 and a spring retainer 160 integral with or otherwise fixed to stem 154. The valve member 156 is slidably carried in a fixed sleeve 162 provided with an inlet port 164 connected via a passage 166 to the servo supply 74. Outlet ports 168 in sleeve 162 communicate via an annulus 170 in casing 68 with a passage 172 leading to a chamber 174 on one side of piston 108. Outlet ports 176 in sleeve 162 communicate via an annulus 178 with a passage 180 leading to chamber 181 at the opposite side of piston 108. Valve member 156 is provided with axially extending slots 182 on each side of land 184 which coact with ports 168 to vary the effective flow area thereof depending upon the degree of movement of valve 156 from the null position shown where land 184 blocks ports 168. Similar axially extending slots 186 are provided on each side of land 188 which coact with ports 176 to vary the effective flow area thereof depending upon the degree of movement from the null position where land 188 blocks ports 176. The slots 182 and 186 which extend axially outwardly from lands 184 and 188, respectively, are adapted to communicate their respective ports 168 and 176 to the interior of casing 68 at drain fuel pressure $P_o$ depending upon the direction of movement of valve 156 from the null position. The slots 182 and 186 which extend axially inwardly from lands 184 and 188, respectively, communicate with inlet port 164 at all times via annulus 190 formed in the central portion of valve 156.

The valve 156 is positioned in accordance with the relative error between a speed request signal established by a two dimension cam 192 as a function of the position of the control lever 60 and an existing engine speed, $N_2$, corrected for engine temperature, signal established by a three dimension cam 194 carried by shaft 90. To that end, a lever 196 pivotally secured to stem 148 by a pin 198 is provided with a slot 200 at one end to receive a pin 202 carried by a follower 204 which rides against the surface of cam 194 and, at the opposite end, is provided with a slot 206 to receive a pin 208 carried by a follower 210 which rides against the surface of cam 192. The follower 210 is defined by a stem 212, one end of which carries pin 208 and the opposite end of which extends into a hollow circular member 214, the latter being slidably carried by casing 68 and provided with a protruding portion 216 which rides against cam 192. A compression spring 218 carried within member 214 bears against a flange 220 secured to the one end of stem 212 urging flange 220 into engagement with the one end of member 214 and establishing a collapsible link between stem 212 and member 214.

The valve 156 is rotated to fixed sleeve 162 by a follower member 222 fixedly secured to one end of valve 156 and engaged with the surface of a rotatable cam 224 carried by a shaft 226. Shaft 226 is journaled in a support 228 and provided with a pinion 230 fixedly secured thereto. The pinion 230 is engaged by a rack 232 which is the output member of a conventional servomotor generally indicated by 234. The rack 232 and thus shaft 226 geared thereto is positioned as a function of an input signal supplied to servomotor 234 which input signal is indicated as compressor discharge pressure, $P_c$.

The shaft 116 on which lever 114 is pivotally mounted is actuatable along the longitudinal axis of slot 118 to thereby vary the effective lever arms of lever 114 which lever arms extend from the axis of shaft 116 to pin 122 in one direction and to pin 110 in the opposite direction. The shaft 116 is actuated by a follower member 236 pivotally mounted on a pin 238 carried by a fixed support 240. One end of follower member 236 is provided with a slot 242 within which the shaft 116 rides. The opposite end of follower member 236 rides against the surface of a rotatable cam 244 carried by a shaft 246 journalled in a support 248. A compression spring 250 suitably mounted bears against follower member 236 to hold the same against cam 244. The shaft 246 is provided with a pinion 252 fixedly secured thereto. The pinion 252 is engaged by a rack 254 which is the output member of a conventional servomotor generally indicated by 256. The rack 254 and thus shaft 246 geared thereto is positioned as a function of an input signal supplied to servomotor which input signal is indicated as compressor discharge pressure, $P_c$.

Referring to FIGURE 3, the rotatably and axially movable valve 156 and fixed sleeve 162 containing the same is shown enlarged to clarify the shape of and the cooperation between the ports 168 and 176 and associated axially extending slots 182 and 186. It will be noted that the position of valve 156 relative to sleeve 162 corresponds to the position of the same shown in FIGURE 2 which is the null position of valve 156 whereby lands 184 and 188 block ports 168 and 176, respectively, to prevent flow therethrough.

*Operation*

It will be assumed that the compressor 28 of the engine is operating at some fixed speed corresponding to the position of the control lever 60 in which case the governor apparatus will occupy the position shown in FIGURE 2 and the metering valve 46 stabilized accordingly to maintain a corresponding fixed fuel flow.

An acceleration of the engine is initiated by moving the control lever 60 to a position corresponding to a higher than existing compressor speed, $N_2$. The cam 192 is rotated in accordance with the control lever 60 position and presents a cam drop to which the follower 210 responds causing lever 196 to pivot clockwise about pin 202 thereby permitting stem 148 to move downwards as viewed in FIGURE 2 under the influence of spring 158. The pin 202 represents a temporary fixed pivot by virtue of the follower 204 being engaged with cam 194. The downward movement of stem 148 results in simultaneous downward movement of valve 156 and movement of lever 124 which pivots clockwise about pin 126 causing movement of lever 114 which pivots counterclockwise about shaft 116. The lever 114, in turn, moves lever 102 which pivots clockwise about pin 104 releasing follower 86 which, under the influence of spring 92, moves into engagement with acceleration cam 88 which establishes the position of follower 86 and valve 84 attached thereto. The resulting movement of valve 84 away from stem 82 causes a corresponding increase in flow area of passage 80 and a subsequent drop in pressure $P_s$ in chamber 72 which, in turn, creates an increase in pressure drop $P_R - P_s$ across piston 66 causing the latter to move toward chamber 72. The piston 66 actuates metering valve 46 in an opening direction thereby increasing fuel flow through conduit 50 to the combustion chamber 30. It will be noted that the piston 66 and valve 84 coact in a followup manner whereby, in response to the above described movement of valve 84, the piston 66 moves in the same direction in response to the pressure drop $P_R - P_s$ generated thereacross until the stem 82 approaches valve 84 causing a decrease in effective flow area of passage 80 and corresponding reduction in pressure drop $P_R - P_s$ across piston 66 whereupon the piston 66 is stabilized for a given position of valve 84. Similarly, stabilization of piston 66 occurs if the valve 84 moves toward stem 82 causing a decrease in area of passage 80 and subsequent decrease in pressure drop $P_R - P_s$ across piston 66. In such an event, the piston 66 moves toward chamber 70 carrying stem 82 away from valve 84 until the resulting increase in flow area of passage 80 produces the pressure drop $P_R - P_s$ required to stabilize piston 66.

The increased fuel flow to combustion chambers 30 results in a subsequent increase in speed, $N_2$, of compressor 28 and a corresponding increasing speed signal input to servomotor 96 which actuates shaft 90 and cams 88 and 194 carried thereby in an axial direction. The cam 88 is suitably contoured axially to provide the desired control over the position of follower 86 and attached valve 84 which, in turn, determines the position of the metering valve 46 and thus quantity of fuel flow determined to the combustion chambers 30 for any given compressor speed, $N_2$, as the engine accelerates from the initial speed setting to the selected speed setting established by the control lever 60. The acceleration fuel flow is modified as a function of the temperature signal input, T, to servomotor 98 which rotates shaft 90 and cams 88 and 194 attached thereto. The temperature, T, is indicated as compressor inlet air temperature but may be any other suitable variable condition of operation upon which engine performance depends as will be recognized by those skilled in the art.

The displacement of valve 156 in response to the aforementioned movement of stem 148 represents the error magnitude between initial compressor speed and selected higher compressor speed. The axial slots 186 and 182 are curved as indicated in FIGURE 2 to provide a progressively increasing slot depth axially outwardly from the respective lands 188 and 184 which results in a greater effective flow area and corresponding higher rate of flow through ports 168 and 176 as the displacement of valve 156 increases from the null position. Thus, in accordance with the aforementioned displacement of valve 156, the slots 186 register with ports 176 permitting fuel at pressure $P_R$ to pass from annulus 190 to ports 176 from which it flows through passage 180 to chamber 181 adjacent piston 108. The slots 182 register with ports 168 permitting fuel to flow from chamber 174 adjacent piston 108 through passage 172 to ports 168 from which it exhausts through slots 182 to the interior of casing 68 at drain fuel pressure, $P_0$. The velocity of piston 108, being dependent upon the rate of flow established by valve 156 into chamber 181 and out of chamber 174, is positioned therefor in accordance with the time integral of the speed error represented by displacement of valve 156 which displacement is proportional to the speed error. A greater speed error results in higher velocity of piston 108 whereas a smaller speed error results in lower velocity of piston 108.

The piston 108 is pressurized by the flow into chamber 181 and moves toward chamber 174 carrying the one end of lever 102 therewith. Simultaneously with movement of piston 108, the increasing speed signal, $N_2$, causing axial movement of shaft 90 and cam 194 is transferred into a position signal by the rising contour of cam 194 which urges follower 204 upward causing lever 196 to pivot about pin 208. The stem 148 follows lever 196 displacing valve 156 toward the null position and actuating lever 124 in a counterclockwise direction about pin 126.

The rate at which the compressor speed, $N_2$, increases is defined by the axial movement of shaft 90. To minimize any tendency for the compressor to overspeed the selected speed, a speed anticipation signal is generated by the piston 134, which moves with shaft 90 thereby developing a fluid pressure which is proportional to the velocity of shaft 90. The piston 134 in moving toward chamber 132 forces fuel therefrom through passage 131 and into bellows 130 where the flow restricting effect of restriction 142 on fuel out of bellows 130 results in a temporary increase in fuel pressure in bellows 130 which varies in accordance with the rate at which speed changes of compressor 28 occur. The stem 128 and pin 126 attached thereto are positioned in response to the expansion of bellows 130 thereby amplifying the existing counterclockwise movement of lever 124 caused by motion of stem 148 and providing a lead signal as a function of the rate at which the selected compressor speed is approached. The counterclockwise motion of lever 124 produces clockwise motion of lever 114 which, in turn, carries pin 110 and associated end of lever 102 upward as viewed in FIGURE 2.

When the compressor 28 reaches the selected speed corresponding to the position of control lever 60, the cam 194 is rotated accordingly to a position whereby follower 204 occupies the position shown in FIGURE 2 and valve 156 occupies its null position with lands 184 and 188 blocking ports 168 and 176, respectively. The follower 86 is lifted off cam 88 by the lever 102 which, through projection 125, engages flange 126 of follower 86 thereby urging valve 84 toward stem 82 which, in turn, results in an increase in pressure $P_s$ and subsequent control over piston 66 and metering valve 46 to reduce fuel flow to combustion chamber 30 and stabilize engine operation at the requested compressor speed.

The displacement of valve 84 in response to the input motion of stem 148 is a proportional relationship by virtue of the various effective lever arms of levers 102, 114 and 124. The displacement of valve 84 for a given input of stem 148 or gain of the proportionally acting governor is varied as a function of compressor discharge pressure, $P_c$, by adjusting the effective lever arm ratio of lever 114 via movement of shaft 16. A relatively low or high compressor discharge pressure, $P_c$, signifies corresponding relatively low or high mass air flow through the compressor 28 which, in turn, affects the engine response characteristics in the heretofore mentioned manner. Thus, the displacement of valve 84 for a given motion of stem 148 or gain must be higher at low compressor discharge valves and reduced accordingly as higher compressor discharge pressures are attained for optimum engine performance. To that end, in accordance with the above described acceleration operation, the compressor discharge pressure, $P_c$, acts through servomotor 256 to rotate cam 244 and position lever 236 accordingly. As pressure $P_c$ increases, the cam 244 actuates lever 236 in a clockwise direction as viewed in FIGURE 2, which, in turn, results in movement of shaft 116 toward pin 110 to decrease the lever arm ratio of lever 114 as established by the axis of shaft 116. It will be observed that the decreased lever arm ratio of lever 114 results in a lesser displacement of valve 84 for a given increment of motion of pin 122 to thereby effect a corresponding reduction in change of fuel flow to the combustion chambers 30 in keeping with the faster response characteristic of the engine.

The gain of the integrating piston 108 is dependent upon the rate of flow into one of the chambers 70 or 72 and out of the opposite chamber. The ports 168 and 176 and associated slots 182 and 186, respectively, are sized to permit fuel to flow out of chamber 70 or 72 at the same rate fuel flows in the opposite chamber. The compressor discharge pressure, $P_c$, acts through servomotor 234 to rotate cam 224 which, in response to an increase in pressure $P_c$, actuates follower 222 causing valve 156 to rotate in a counterclockwise direction as viewed from the follower 222 end of valve 156. Referring to FIGURE 3, which illustrates the valve 156 in a null position, the counterclockwise movement of valve 156 as viewed from the right hand end of the valve 156 results in transverse displacement of slots 186 and 182 relative to associated ports 176 and 168 which reduces the effective flow area established by the slots 182, 186 registering with their respective ports 168, 176 for any given axial position of valve 156 from the null position in response to a speed error. In the case of the heretofore described request for an engine acceleration, the valve 156 occupies a position to the left of the null position shown in FIGURE 3, whereby slot 186 overlaps port 176 to vent annulus 190 to passage 180 and slot 182 overlaps port 168 to vent passage 172 to drain fuel pressure $P_o$. As the valve 156 moves to the right in response to the compressor speed, $N_2$, increasing toward the requested speed, the effective flow area of port 176 decreases in accordance with the axial position of slot 186 as well as the transverse position of slot 186 relative to port 176 in response to compressor discharge pressure $P_c$. Thus, the rate of flow through port 176 to chamber 181 as well as the flow through port 168 from chamber 174 which determines the response of integrator piston 108 is decreased as a function of increasing compressor discharge pressure, $P_c$, to vary the gain of the integrator piston 108.

The above described actuation of the governor system is described in terms of an engine acceleration. However, it will be understood that a reverse sequence of operation will occur during engine deceleration to a lower than existing speed. The gains of the proportional and integrating governor system are described as varying as a function of one variable condition of operation, compressor discharge pressure $P_c$. If desired, the proportional or integrating gain may be varied as a function if one variable condition of engine operation such as compressor discharge pressure $P_c$ while the other gain is varied as a function of a different variable condition of engine operation suitable for the desired purpose.

It will be apparent to those persons skilled in the art that various changes in the form and relative arrangement of parts may be made to omit requirements of a particular system without departing from the scope of applicants' invention as defined by the following claims.

We claim:

1. Control apparatus for actuating a controllable member in response to an error input signal which controllable member, in turn, controls apparatus having a variable response characteristic depending upon operating conditions associated therewith, said control apparatus comprising:
   a proportional type servomechanism operatively connected to the controllable member for actuating the same;
   an integrating type servomechanism operatively connected to the controllable member for actuating the same;
   means responsive to the error input signal operatively connected to said proportional and integrating type servomechanisms for introducing an input signal thereto representative of the error input signal;
   first means operatively connected to said proportional type servomechanism for varying the gain thereof;
   second means operatively connected to said integrating type servomechanism for varying the gain thereof; and
   means responsive to at least one variable condition of operation associated with the apparatus controlled by the controllable member operatively connected to said first and second means for actuating the same.

2. Control apparatus as claimed in claim 1 wherein said means responsive to at least one variable condition of operation includes:
   a first means responsive to said variable condition of operation operatively connected to said proportional type servomechanism for varying the gain thereof as a first function of said variable condition of operation; and
   a second means responsive to said variable condition of operation operatively connected to said integrating type servomechanism for varying the gain thereof as a second function of said variable condition of operation.

3. Control apparatus as claimed in claim 1 wherein said error input signal is defined by the difference between a request signal and an output signal derived from a condition of operation of the control apparatus, said control apparatus further including:
   means responsive to the output signal operatively connected to said proportional type servomechanism for modifying the operation thereof as a function of the rate at which the output signal varies.

4. Control apparatus as claimed in claim 1 wherein said proportional type servo-type mechanism includes:
   a first lever pivotally mounted on a support and actuated by said means responsive to the error input signal;
   a second lever pivotally mounted on a movable support and actuated by said first lever;
   a third lever operatively connected at one end to said integrating type servomechanism and at the opposite end to said second lever and operatively connected to the controllable member for actuating the latter;
   said means responsive to at least one variable condition of operation operatively connected to said movable support for actuating the same to vary the effective lever arm ratio of said second lever and thus the gain of said proportional type servomechanism as a function of said variable condition of operation.

5. Control apparatus as claimed in claim 1 wherein said integrating type servomechanism includes:
   a fluid pressure operated piston operatively connected to the controllable member; and
   axially and rotatably movable valve means for controlling the rate of pressurized fluid to said piston;
   said means responsive to the error input signal operatively connected to said movable valve means for actuating the same in one of the axial and rotary directions;
   said means responsive to at least one variable condition of operation operatively connected to said movable valve means in the other of the axial and rotary directions.

6. Control apparatus as claimed in claim 3 including:
a first cam defining the request signal;
a second cam defining the output signal;
a movable shaft supporting said second cam;
means responsive to the output signal operatively connected to said movable shaft for actuating the same;
a piston slidably carried in a fluid filled chamber and operatively connected to said shaft for movement therewith;
conduit means including a flow restriction connecting said fluid filled chamber with a source of relatively low drain fluid pressure; and
a bellows responsive to the fluid pressure differential generated across said flow restriction in response to movement of said piston;
said bellows being operatively connected to said proportional and integrating type servomechanisms and adapted to temporarily modify the effect of said servomechanisms on said controllable member in accordance with the rate at which the output signal varies.

References Cited

UNITED STATES PATENTS

| | | | |
|---|---|---|---|
| 2,966,161 | 12/1960 | McCombs | 137—48 |
| 2,981,271 | 4/1961 | Cowles | 137—26 |
| 3,319,641 | 5/1967 | Stearns | 137—18 |

CLARENCE R. GORDON, *Primary Examiner.*